(12) United States Patent
Cohen et al.

(10) Patent No.: US 9,008,116 B2
(45) Date of Patent: Apr. 14, 2015

(54) CROSS-MEDIA COMMUNICATION COORDINATION

(75) Inventors: Alexander J. Cohen, Mill Valley, CA (US); Edward K. Y. Jung, Bellevue, WA (US); Royce A. Levien, Lexington, WA (US); Robert W. Lord, Seattle, WA (US); Mark A. Malamud, Seattle, WA (US); William Henry Mangione-Smith, Kirkland, WA (US); John D. Rinaldo, Jr., Bellevue, WA (US); Clarence T. Tegreene, Bellevue, WA (US)

(73) Assignee: The Invention Science Fund I, LLC, Bellevue, WA (US)

( * ) Notice: Subject to any disclaimer, the term of this patent is extended or adjusted under 35 U.S.C. 154(b) by 1408 days.

(21) Appl. No.: 11/709,904

(22) Filed: Feb. 20, 2007

(65) Prior Publication Data
US 2008/0198844 A1     Aug. 21, 2008

(51) Int. Cl.
*H04J 3/16*       (2006.01)
*H04L 12/54*    (2013.01)
*H04L 29/06*    (2006.01)

(52) U.S. Cl.
CPC ....... *H04L 12/5692* (2013.01); *H04L 29/06068* (2013.01)

(58) Field of Classification Search
CPC .................. H04L 29/06068; H04L 12/5692
USPC ................ 709/209, 227, 231, 246, 249, 248; 370/260, 249, 389, 390, 400, 466
See application file for complete search history.

(56) References Cited

U.S. PATENT DOCUMENTS

| | | | |
|---|---|---|---|
| 5,404,558 A * | 4/1995 | Okamoto | 712/27 |
| 5,446,874 A * | 8/1995 | Waclawsky et al. | 714/1 |
| 5,721,919 A | 2/1998 | Morel et al. | |
| 7,024,100 B1 | 4/2006 | Furuyama | |
| 7,127,261 B2 | 10/2006 | Van Erlach | |
| 7,139,555 B2 | 11/2006 | Apfel | |
| 7,280,546 B1 | 10/2007 | Sharma et al. | |
| 2001/0021189 A1* | 9/2001 | Shiota | 370/389 |
| 2001/0042114 A1 | 11/2001 | Agrahram | |
| 2002/0015418 A1 | 2/2002 | Uemura | |
| 2002/0031092 A1* | 3/2002 | Wakabayashi et al. | 370/249 |
| 2002/0178277 A1* | 11/2002 | Laksono | 709/231 |
| 2003/0018793 A1* | 1/2003 | Mora | 709/230 |
| 2003/0105393 A1* | 6/2003 | Sutherland et al. | 600/407 |
| 2003/0151618 A1* | 8/2003 | Johnson et al. | 345/716 |

(Continued)

OTHER PUBLICATIONS

U.S. Appl. No. 12/928,447, filed Dec. 9, 2010, Cohen et al.

*Primary Examiner* — Ajay Cattungal

(57) ABSTRACT

Methods and a media system for cross-media communication coordination may include but are not limited to receiving one or more data packets via one or more modes of communication; providing a data storage format for the one or more data packets; providing an identification tag to enable manipulation of one or more selected data packets; and converting the one or more selected data packets from an original communication type to an alternative communication type. Other methods and systems for cross-media communication coordination may include but are not limited to receiving one or more data packets; determining an original media type associated with the one or more data packets; and converting one or more selected data packets using the original media type to a specified content storage format appropriate for including in a further communication to a predetermined computing device.

73 Claims, 7 Drawing Sheets

(56) References Cited

U.S. PATENT DOCUMENTS

| | | | |
|---|---|---|---|
| 2003/0172188 A1* | 9/2003 | Hasegawa et al. | 709/249 |
| 2003/0177276 A1* | 9/2003 | Chiu et al. | 709/313 |
| 2003/0187350 A1* | 10/2003 | Omiya | 600/428 |
| 2004/0148362 A1 | 7/2004 | Friedman | |
| 2004/0168205 A1 | 8/2004 | Nesvadba | |
| 2004/0187157 A1 | 9/2004 | Chong | |
| 2004/0240562 A1 | 12/2004 | Bargeron et al. | |
| 2004/0243388 A1 | 12/2004 | Corman et al. | |
| 2005/0010686 A1 | 1/2005 | Nishida et al. | |
| 2005/0022252 A1 | 1/2005 | Shen | |
| 2005/0044316 A1 | 2/2005 | Kottomtharayil | |
| 2005/0055418 A1* | 3/2005 | Blanc et al. | 709/209 |
| 2005/0080755 A1* | 4/2005 | Aoyama | 707/1 |
| 2005/0160070 A1* | 7/2005 | Mashni et al. | 707/1 |
| 2005/0197964 A1 | 9/2005 | Duggan | |
| 2005/0232166 A1* | 10/2005 | Nierhaus | 370/260 |
| 2005/0262144 A1 | 11/2005 | Teng | |
| 2006/0090082 A1 | 4/2006 | Apostolopoulos | |
| 2006/0101060 A1 | 5/2006 | Li | |
| 2006/0156218 A1* | 7/2006 | Lee | 715/500.1 |
| 2006/0167956 A1 | 7/2006 | Chasen et al. | |
| 2006/0173859 A1* | 8/2006 | Kim et al. | 707/10 |
| 2006/0195590 A1 | 8/2006 | Tsubota | |
| 2006/0206580 A1* | 9/2006 | Johnson, III | 709/217 |
| 2007/0147262 A1* | 6/2007 | Aaron et al. | 370/250 |
| 2007/0156925 A1* | 7/2007 | Shigeta et al. | 709/246 |
| 2007/0229889 A1* | 10/2007 | Henry et al. | 358/1.15 |
| 2008/0077694 A1* | 3/2008 | Nordmark et al. | 709/227 |
| 2008/0235227 A1* | 9/2008 | Kwok et al. | 707/6 |
| 2008/0282353 A1 | 11/2008 | Kamperman et al. | |
| 2009/0086975 A1 | 4/2009 | Robert et al. | |

* cited by examiner

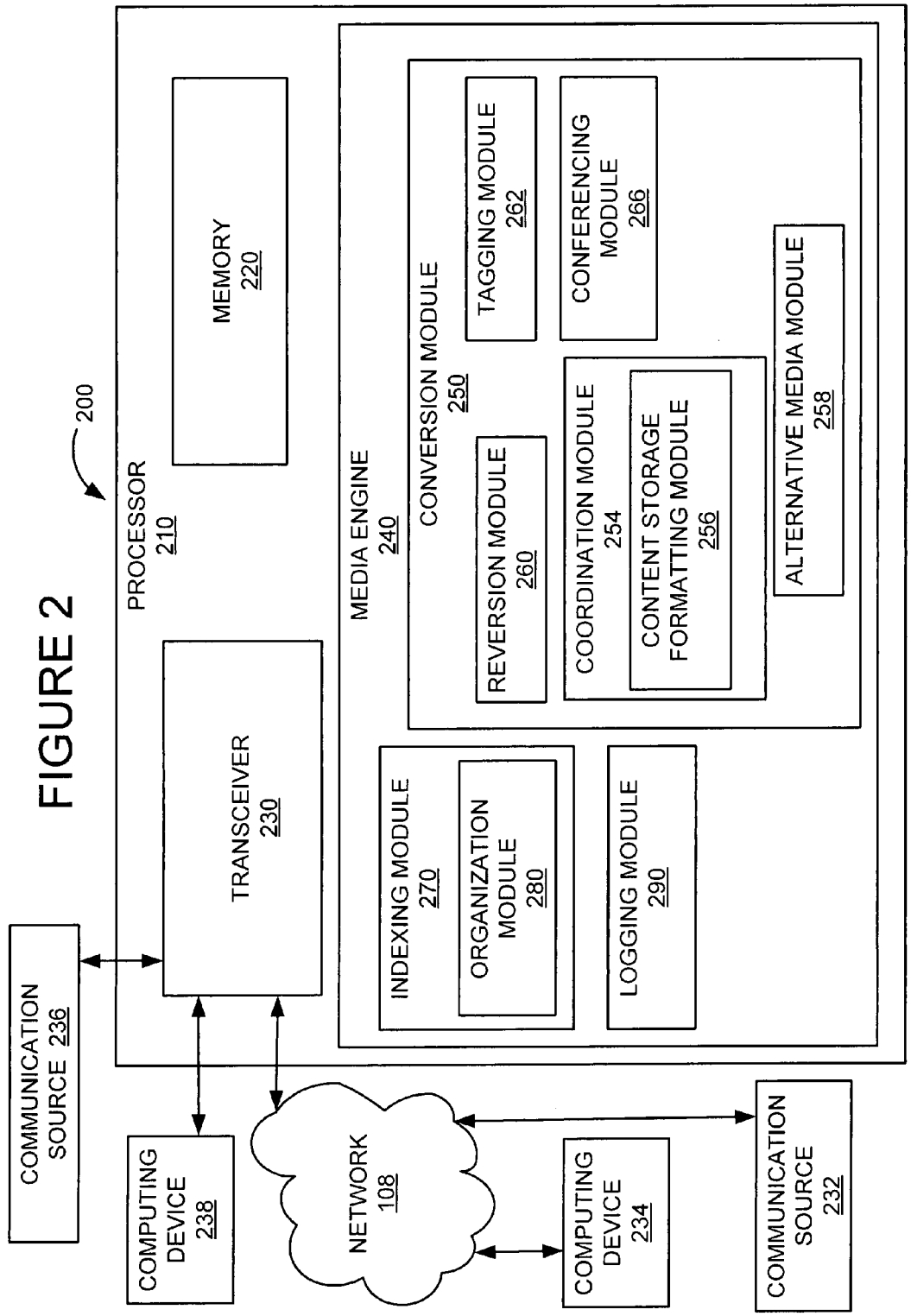

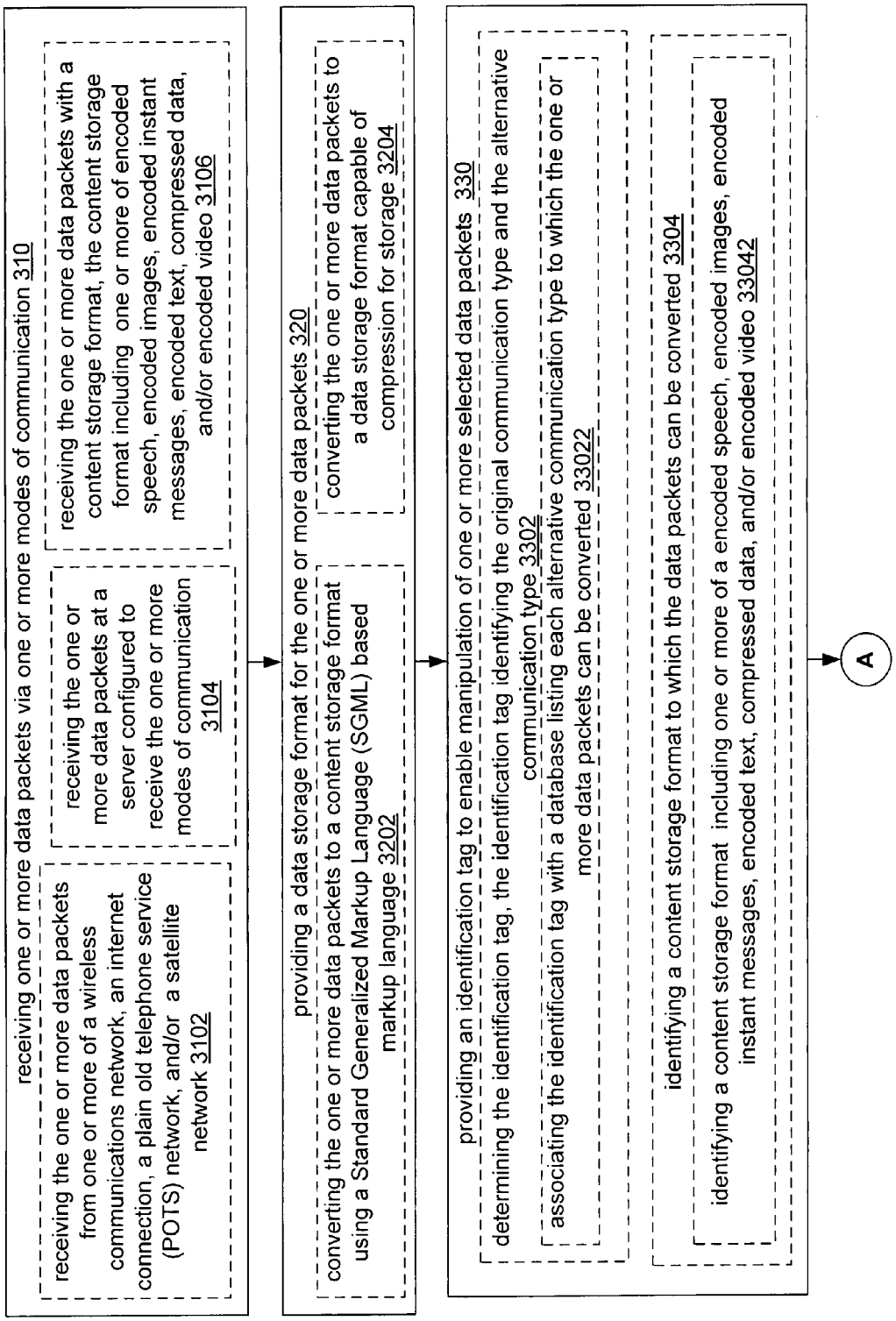

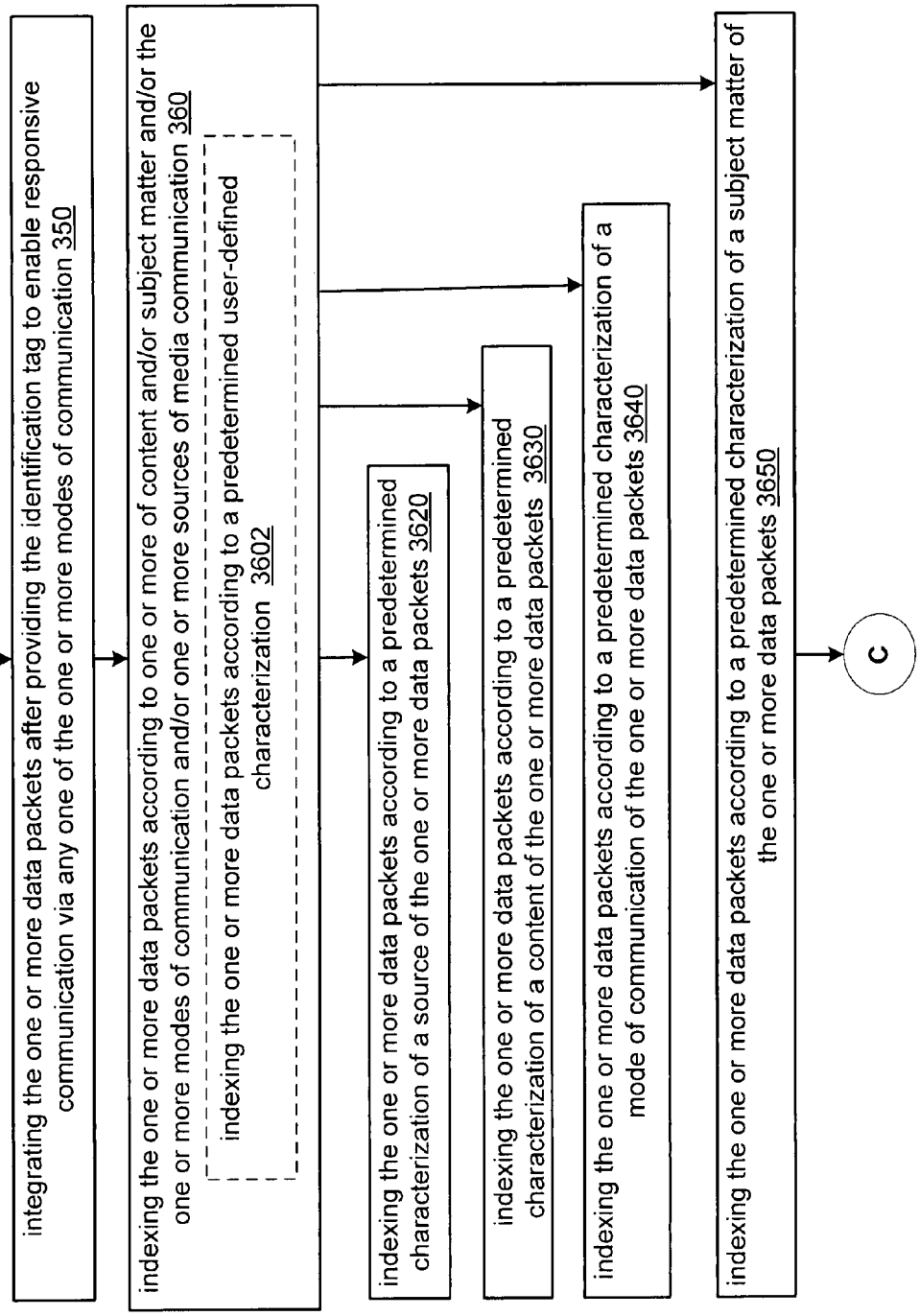

CROSS-MEDIA COMMUNICATION COORDINATION

BACKGROUND

The present application relates generally to cross-media communication coordination services, as well as various systems, processes and devices for implementing such services.

SUMMARY

In one aspect, a method for coordinating communication includes but is not limited to receiving one or more data packets via one or more modes of communication; providing a data storage format for the one or more data packets; providing an identification tag to enable manipulation of one or more selected data packets; and converting the one or more selected data packets from an original communication type to an alternative communication type. In addition to the foregoing, other method aspects are described in the claims, drawings, and text forming a part of the present application.

In another aspect, a computer program product related to communication coordination includes but is not limited to a signal bearing medium bearing at least one of one or more instructions for receiving one or more data packets via one or more modes of communication; one or more instructions for providing a data storage format for the one or more data packets; one or more instructions for providing an identification tag to enable manipulation of one or more selected data packets; and one or more converting the one or more selected data packets from an original communication type to an alternative communication type. In addition to the foregoing, other computer program product aspects are described in the claims, drawings, and text forming a part of the present application.

In a further aspect, a method for media coordination includes but is not limited to receiving one or more data packets; determining an original media type associated with the one or more data packets; and converting one or more selected data packets using the original media type to a specified content storage format appropriate for including in a further communication to a predetermined computing device.

In another aspect, a computer program product includes but is not limited to a signal bearing medium bearing at least one or more instructions for receiving one or more data packets; one or more instructions for determining an original media type associated with the one or more data packets; and one or more instructions for converting one or more selected data packets using the original media type to a specified content storage format appropriate for including in a further communication to a predetermined computing device.

In one or more various aspects, related systems include but are not limited to circuitry and/or programming for effecting the herein-referenced method aspects; the circuitry and/or programming can be virtually any combination of hardware, software, and/or firmware configured to effect the herein-referenced method aspects depending upon the design choices of the system designer.

In one aspect, a media system for one or more types of media includes but is not limited to a processor; a memory coupled to the processor; transceiver coupled to the processor, the transceiver configured to send and receive one or more data packets holding the one or more types of media; and a media engine coupled to the processor, the media engine configured to integrate the one or more types of media; the media engine is configured to include at least a conversion module coupled to the processor, the conversion module configured to convert one or more received data packets to a standardized data format, and a logging module coupled to the processor, the logging module configured to log the one or more received data packets in either a converted or an original media type to enable manipulation of the received one or more data packets. In addition to the foregoing, other cross-media communication coordination system aspects are described in the claims, drawings, and text forming a part of the present application.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

FIG. 2 is a block diagram of an exemplary system that supports the claimed subject matter of the present application.

FIGS. 3A and 3B illustrate a flow diagram of exemplary method features in accordance with various embodiments of the subject matter of the present application.

FIGS. 3C and 3D illustrate a flow diagram of exemplary method features in accordance with additional embodiments of the subject matter of the present application.

DETAILED DESCRIPTION

Figure 1:
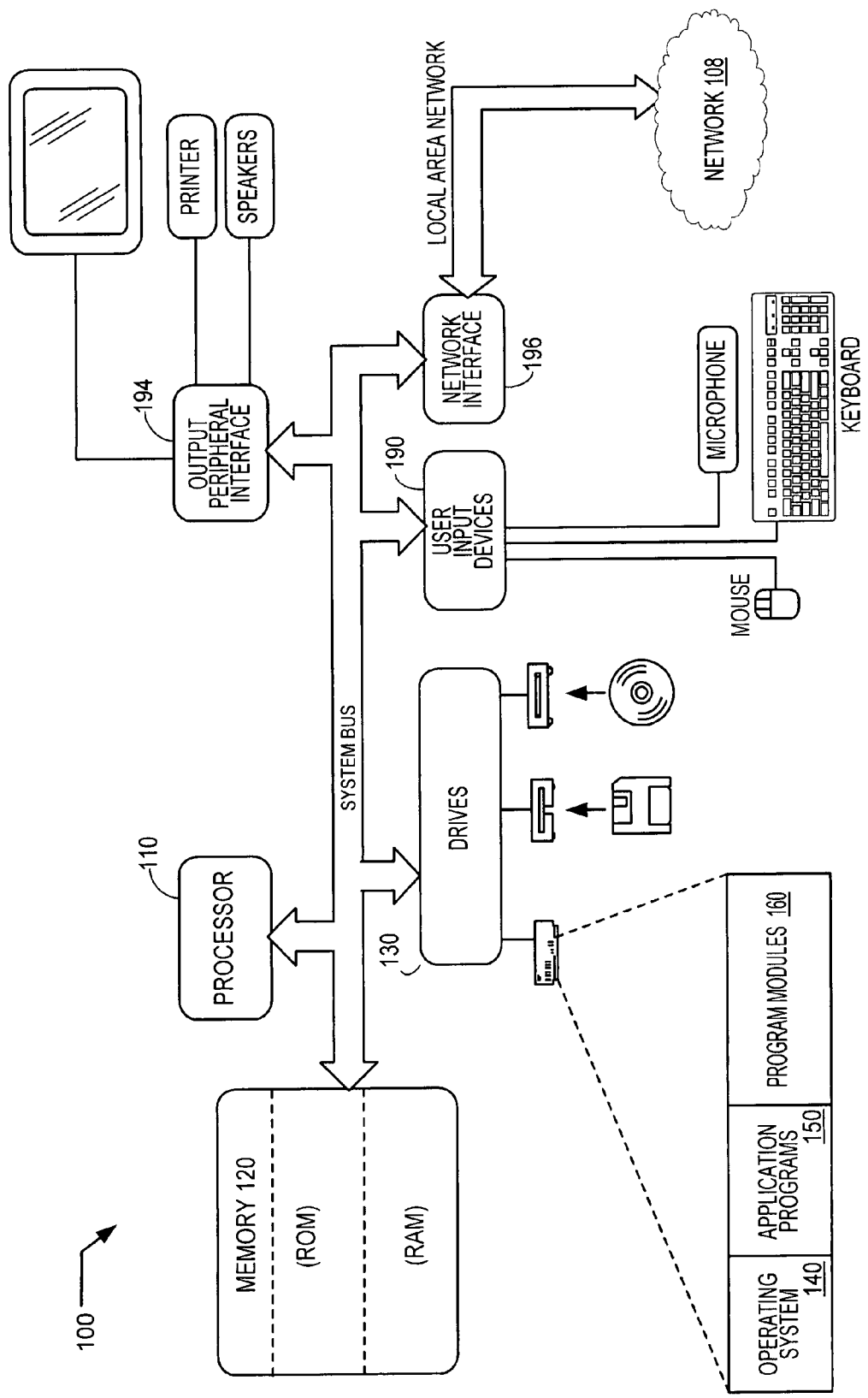
FIG. 1 is a block diagram of an exemplary computer architecture that supports the claimed subject matter of the present application.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

In the description that follows, the subject matter of the application will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer which reconfigures or otherwise alters the operation of the computer in a manner well understood by those skilled in the art. The data structures where data is maintained are physical locations of the memory that have particular properties defined by the format of the data. However, although the subject matter of the application is being described in the foregoing context, it is not meant to be limiting as those of skill in the art will appreciate that some of the acts and operations described hereinafter can also be implemented in hardware, software, and/or firmware and/or some combination thereof.

With reference to FIG. 1, depicted is an exemplary computing system for implementing embodiments. FIG. 1 includes a computer 100, including a processor 110, memory 120 and one or more drives 130. The drives 130 and their associated computer storage media, provide storage of computer readable instructions, data structures, program modules and other data for the computer 100. Drives 130 can include an operating system 140, application programs 150, and program modules 160. Computer 100 further includes user input devices 190 through which a user may enter commands and data. Input devices can include an electronic digitizer, a microphone, a keyboard and pointing device, commonly referred to as a mouse, trackball or touch pad. Other input devices may include a joystick, game pad, satellite dish, scanner, or the like.

These and other input devices can be connected to processor 10 through a user input interface that is coupled to a system bus, but may be connected by other interface and bus structures, such as a parallel port, game port or a universal serial bus (USB). Computers such as computer 100 may also include other peripheral output devices such as speakers, which may be connected through an output peripheral interface 194 or the like.

Computer 100 may operate in a networked environment using logical connections to one or more computers, such as a remote computer connected to network interface 196 The remote computer may be a personal computer, a server, a router, a network PC, a peer device or other common network node, and can include many or all of the elements described above relative to computer 100. Networking environments are commonplace in offices, enterprise-wide area networks (WAN), local area networks (LAN), intranets and the Internet. For example, in the subject matter of the present application, computer 100 may comprise the source machine from which data is being migrated, and the remote computer may comprise the destination machine or vice versa. Note however, that source and destination machines need not be connected by a network 108 or any other means, but instead, data may be migrated via any media capable of being written by the source platform and read by the destination platform or platforms. When used in a LAN or WLAN networking environment, computer 100 is connected to the LAN through a network interface 196 or an adapter. When used in a WAN networking environment, computer 100 typically includes a modem or other means for establishing communications over the WAN, such as the Internet or network 108. It will be appreciated that other means of establishing a communications link between the computers may be used.

According to one embodiment, computer 100 is connected in a networking environment such that processor 110 and/or program modules 160 can perform with or as a cross-media communication coordination system with a media engine capable of instantiating a conversion module and/or logging module in accordance with embodiments herein.

Referring now to FIG. 2, illustrated is an exemplary block diagram for an embodiment of a cross-media communication coordination system 200. As shown, the illustrated media system 200 includes a processor 210, a memory 220, coupled to the processor 210. FIG. 2 also illustrates a transceiver 230 which can be configured to send a receive data packets in different formats, and send and receive one or more data packets holding the one or more types of media. Transceiver 230 can be configured to interface with various modes of communication (e.g., communication links) to send and receive data packets holding one or more types of media. FIG. 2 also illustrates media engine 240 accessible by processor 210 and by network 108 (see FIG. 1). Such accessibility to the media engine 240 may be provided through a communication link via network 108 to a communication source 232, as well as to one or more computing devices 234 (e.g., personal communication device, mobile device, etc.) capable of receiving a responsive type of media communication in a suitable format. In some implementations such accessibility to the media engine 240 may include a more direct (e.g., non-network) communication link to a communication source 236, as well as to one or more computing devices 238 capable of receiving a responsive type of media communication in a suitable format. It will be understood that in some implementations the communication source 232, 236 may also be a destination computing device for a responsive type of media communication. The exemplary media engine 240 may be configured to integrate, manipulate, modify, identify and/or store one or more types of media.

FIG. 2 further illustrates exemplary components within media engine 240. For example, media engine 240 includes modules, some or all of which can be implemented as program modules 160, as shown in FIG. 1. Specifically, FIG. 2 illustrates a conversion module 250 disposed within media engine 240. Disposed within conversion module 250 are several modules including reversion module 260, tagging module 262, conferencing module 266, alternative media module 258 and coordination module 254, indexing module 270 and logging module 290. Coordination module illustrates a content storage formatting module 256 disposed within coordination module 254. Indexing module 270 illustrates an organization module 280 disposed within indexing module 270.

Conversion module 250 can be configured to convert one or more received data packets to a standardized data format. A standardized data format can include a format according to an accepted standard in an industry and/or a proprietary standard data format and/or a data format that is considered a standard for particular purpose, a particular industry, and/or a particular time period. Conversion module 250 can be configured to convert received data packets to an SGML-based data format and/or an ASCII-based text format. Conversion module 250 can also be configured for converting the one or more received data packets by removing data packet envelopes around core data packets. Reversion module 260 can be configured to enable a user of a computing device to respond to a data packet in a predetermined media type.

Indexing module 270 can be configured to receive one or more data packets in a standardized data format and index the data packets to enable a search of the one or more data packets in a standardized data format. Logging module 290 can be coupled to the processor and configured to log the one or more received data packets. In one embodiment, logging module 290 can operate on either a converted or an original media type to enable manipulation of the received one or more data packets without regard to media type of the received one or more data packets. The logging module 290 can also be configured as a database for storing data packets as will be appreciated by one of skill in the art with the benefit of the present disclosure.

Organization module 280, shown disposed within indexing module 270, can be configured to receive data packets in the standardized data format and index the one or more data packets according to one or more of content, subject matter of data packets, media type, and source of the one or more data packets destination. Like logging module 290, organization module can also be configured as a database according to system requirements. Depending on the type of data packets received, and the necessity thereof, some data packets can be appropriate for storing while others could be temporary type data packets.

In one embodiment, conversion module 250 further includes a coordination module 254. Coordination module 254 can be configured to convert the one or more received data packets and/or a selected subset of the one or more received data packets to enable a user of the computing device to communicate using a predetermined media type. In one embodiment, coordination module 254 is configured to include a content storage formatting module 256. Content storage formatting module 256 can be configured for converting received data packets and/or a selected subset of the received data packets to a specified content storage format appropriate for including in a further communication to a predetermined computing device.

In another embodiment, conversion module 250 includes alternative media module 258. Alternative media module 258 can be configured to convert the received data packets to a standardized media type for purposes of sending selected data packets to a conference group, to a sender, a mobile device, an archive, and/or to an output device. In one embodiment, alternative media module 258 is further configured for converting the received data packets from an original media type to a media type appropriate for enabling a conference with one or more media types, which could include a simple text format, a visual format, a non-English language format, and/or a voice only format.

In one embodiment, conversion module 250 is coupled to indexing module 270 such that indexing module 270 indexes received data packets according to the alternative media type, which can be determined via alternative media module 258, and/or a target destination for the received data packets.

Conversion module 250 further includes a tagging module 262. Tagging module 262 can be configured to create a conversion tag to enable a recipient server to convert a responsive data packet to the original media type or to another appropriate media type.

In one embodiment, conversion module 250 can include a conferencing module 258 configured for enabling a conference with multiple forms of media types. For example, the media types in the conference can include image data and/or voice data and/or video and/or text data, and the conferencing module can be configured to enable conferencing with parties using a plurality of media types.

It will be understood that the illustrated system embodiments of FIGS. 1-2 are provide by way of example only, and are not intended to be limiting. Furthermore, it will be understood that the various process features and system components disclosed herein may be incorporated in different embodiment combinations depending on the circumstances.

Figure 3B:
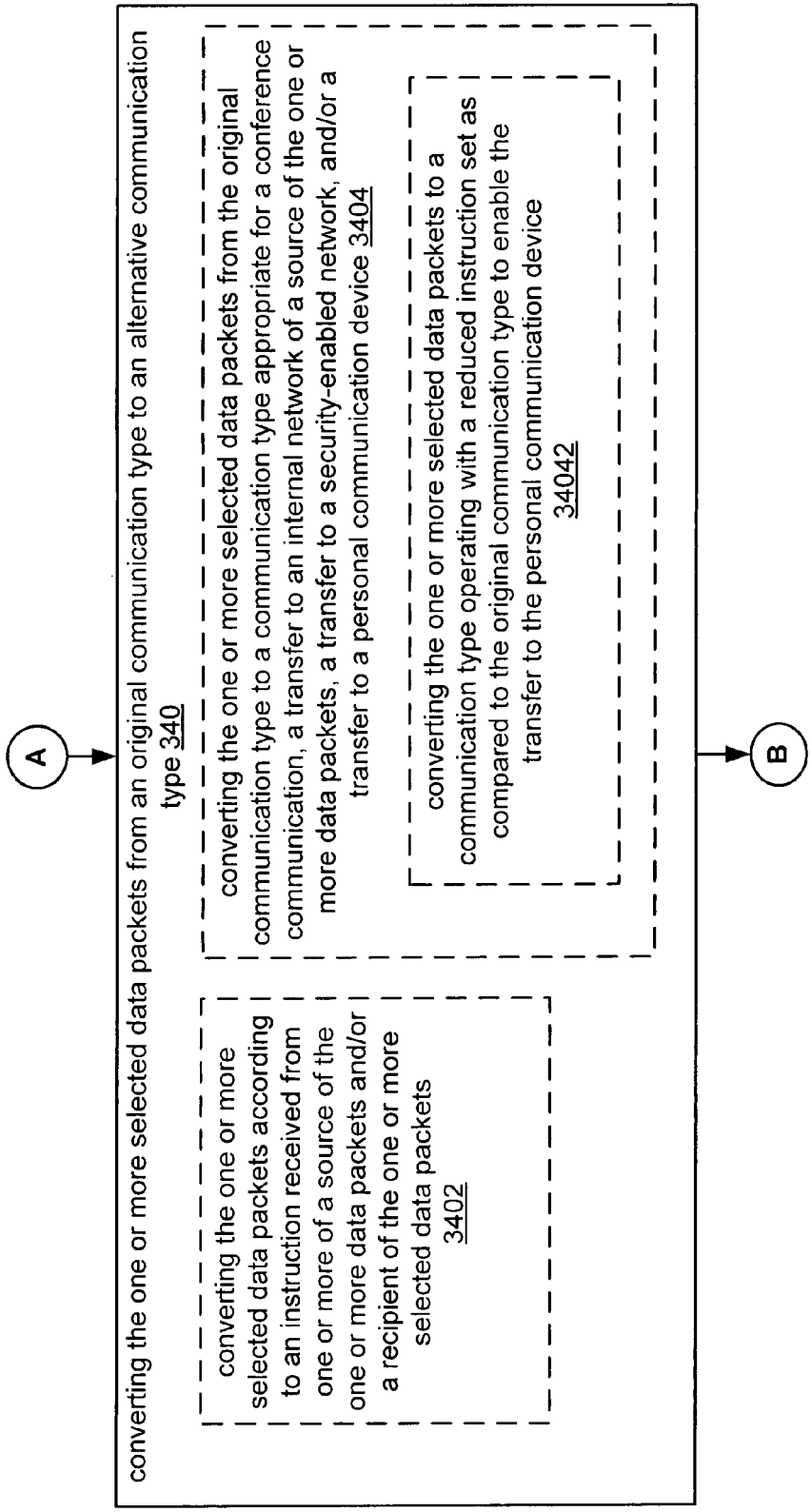

Referring now to FIGS. 3A, 3B and 3C, an exemplary flow diagram illustrates the operation of various aspects of a cross-media communication coordination system in accordance with different embodiments.

As illustrated in FIG. 3A, block 310 provides for receiving one or more data packets via one or more modes of communication (e.g., cross-media communication coordination system 200 receiving data packets via network 108). Depicted within block 310 is optional block 3102, which provides for receiving the one or more data packets from one or more of a wireless communications network, an internet connection, a plain old telephone service (POTS) network, and/or a satellite network (e.g., cross-media communication coordination system 200 receiving one or more data packets via network 108 wherein network 108 is a wireless network, internet, phone service or satellite network). As will be appreciated, the data packets can be received over many different types of communications networks and be of vastly different types of media when received at media engine 240.

Depicted within block 310 is optional block 3104, which provides for receiving the one or more data packets at a server configured to receive the one or more modes of communication (e.g., cross-media communication coordination system 200 receiving the data packets at a server such as computer system 100 configured to receive different types of media communication via network 108). The server can be a computer system 100 or other appropriately configured server that receives digital data and is able to parse the data packets into appropriate parts for later conversion, if necessary.

Depicted within block 310 is optional block 3106, which provides for receiving the one or more data packets with a content storage format, the content storage format including one or more of encoded speech, encoded images, encoded instant messages, encoded text, compressed data, and/or encoded video (e.g., cross-media communication coordination system 200 receiving the data packets as different types of media communication via network 108 as encoded speech, encoded images, encoded instant messages, encoded text, compressed data, and/or encoded video).

Block 320 illustrates an aspect for providing a data storage format for the one or more data packets (e.g., conversion module 250 converting the data packets into a data storage format to enable storing the data packets).

Depicted within block 320 is optional block 3202, which provides for converting the one or more data packets to a content storage format using a Standard Generalized Markup Language (SGML) based markup language (e.g., conversion module 250 converting received data packets to SGML). For example, the converting data packets can be to SGML to enable a reduced data format, such as a data format appropriate for smart card usage, wireless phone usage, or another hypertext format.

Also depicted within block 320 is optional block 3204, which provides for converting the one or more data packets to a data storage format capable of compression for storage.

Block 330 provides for providing an identification tag to enable manipulation of one or more selected data packets (e.g., tagging module 262 and/or logging module 290 providing an identification tag for enabling manipulation of the data packets). Disposed within block 330 is optional block 3302, which provides for determining the identification tag, the identification tag identifying the original communication type and the alternative communication type (e.g., tagging module 262 determining the identification tag according to communication type, which can include an original communication type and/or the alternative communication type). Disposed within optional block 3302 is optional block 33022 which provides for associating the identification tag with a database listing each alternative communication type to which the one or more data packets can be converted (e.g., tagging module 262 and/or logging module 290 associating the identification tag with a database within media engine 240).

Block 330 further provides in optional block 3304 for identifying a content storage format to which the data packets can be converted (e.g., content storage formatting module 256 identifying a content storage format to which the data packets can be converted). Disposed within optional block 3304 is optional block 33042, which provides for identifying a content storage format including one or more of a encoded speech, encoded images, encoded instant messages, encoded text, compressed data, and/or encoded video (e.g., content storage formatting module determining whether a content storage format should include encoded speech, encoded images, encoded instant messages, encoded text, compressed data, and/or encoded video).

Referring now to FIG. 3B, the exemplary method flow diagram continues with block 340. More specifically, block 340 provides for converting the one or more selected data packets from an original communication type to an alternative communication type (e.g., conversion module 250 converting the one or more selected data packets from an original media type to an alternative media type). Disposed within block 340 is optional block 3402 which provides for converting the one or more selected data packets according to an instruction received from one or more of a source of the one or more data packets and/or a recipient of the one or more selected data packets (e.g., conversion module 250 converting the one or more selected data packets according to a received instruction from a source over network 108 or a recipient over network 108). Also disposed within block 340 is optional block 3404, which provides for converting the one or more selected data packets from the original communication type to a communication type appropriate for a conference communication, a transfer to an internal network of a source of the one or more data packets, a transfer to a security-enabled network, and/or a transfer to a personal communication device (e.g., conversion module 250 converting the selected data packets from the original communication via conferencing module 266 to a conference communication type or conversion module 250 converting the selected data packets for purposes of a transfer to an internal network via network interface 196, or for purposes of a transfer over network 108 and/or to a personal communication device). Disposed within optional block 3404 is optional block 34042 which provides for converting the one or more selected data packets to a communication type operating with a reduced instruction set as compared to the original communication type to enable the transfer to the personal communication device (e.g., conversion module 250 converting the selected data packets to a communication type that uses a reduced instruction set appropriate for a personal communication device).

Referring now to FIG. 3C, the exemplary flow diagram continues with a further possible feature depicted in block 350. Block 350 provides for integrating the one or more data packets after providing the identification tag to enable responsive communication via any one of the one or more modes of communication (e.g., conversion module 250 converting the data packets and then integrating the logged and converted data packets into an outgoing communication over network 108).

Another possible feature depicted in block 360 provides for indexing the one or more data packets according to one or more of content and/or subject matter and/or the one or more modes of communication and/or one or more sources of media communication (e.g., indexing module 270 indexing logged data packets logged via logging module 290 according to a subject matter of the data or according the type of media communication or source of media communication). Depicted within block 360 is optional block 3602 which provides for indexing the one or more data packets according to a predetermined user-defined characterization (e.g., indexing module 270 indexing packets previously converted in conversion module 250 and/or logged in logging module 290 according to a predetermined user-defined characterization).

In different embodiments, indexing can be performed according to different predetermined characterizations in accordance with system requirements and/or user requirements. Thus, the exemplary flow diagram of FIG. 3C continues with block 3620, 3630, 3640 and 3650 which provide for various different possible indexing methods which may be provided separately or in combination in no particular order. Specifically, block 3620 provides for indexing the one or more data packets according to a predetermined characterization of a source of the one or more data packets (e.g., indexing module 270 indexing the data packets according to a predetermined characterization of a source of the data packets). Block 3620 is followed by block 3630 which provides for indexing the one or more data packets according to a predetermined characterization of a content of the one or more data packets (e.g., indexing module 270 indexing the data packets according to a predetermined characterization of the content within the data packets). Block 3640 provides for indexing the one or more data packets according to a predetermined characterization of a mode of communication of the one or more data packets (e.g., indexing module 270 indexing the data packets according to a predetermined characterization of a mode of communication of the data packets). The modes of communication can include Internet communication, wireless communication, radio frequency communication, satellite communication and other modes of communication. Block 3650 provides for indexing the one or more data packets according to a predetermined characterization of a subject matter of the one or more data packets (e.g., indexing module 270 indexing the data packets according to a predetermined characterization of subject matter of the data packets, including indexing according to topic of the data packets, metadata describing the data in the data packets, a description of the subject matter from an outside source describing the data packet subject matter and the like). In one embodiment, indexing module 270 or another program module determines a file extension of data within the data packet to enable indexing. For example, indexing can determine whether the data packets contain .jpg files, .wav files, .mp3 files, .doc files, .xml files and the like.

Figure 3D:
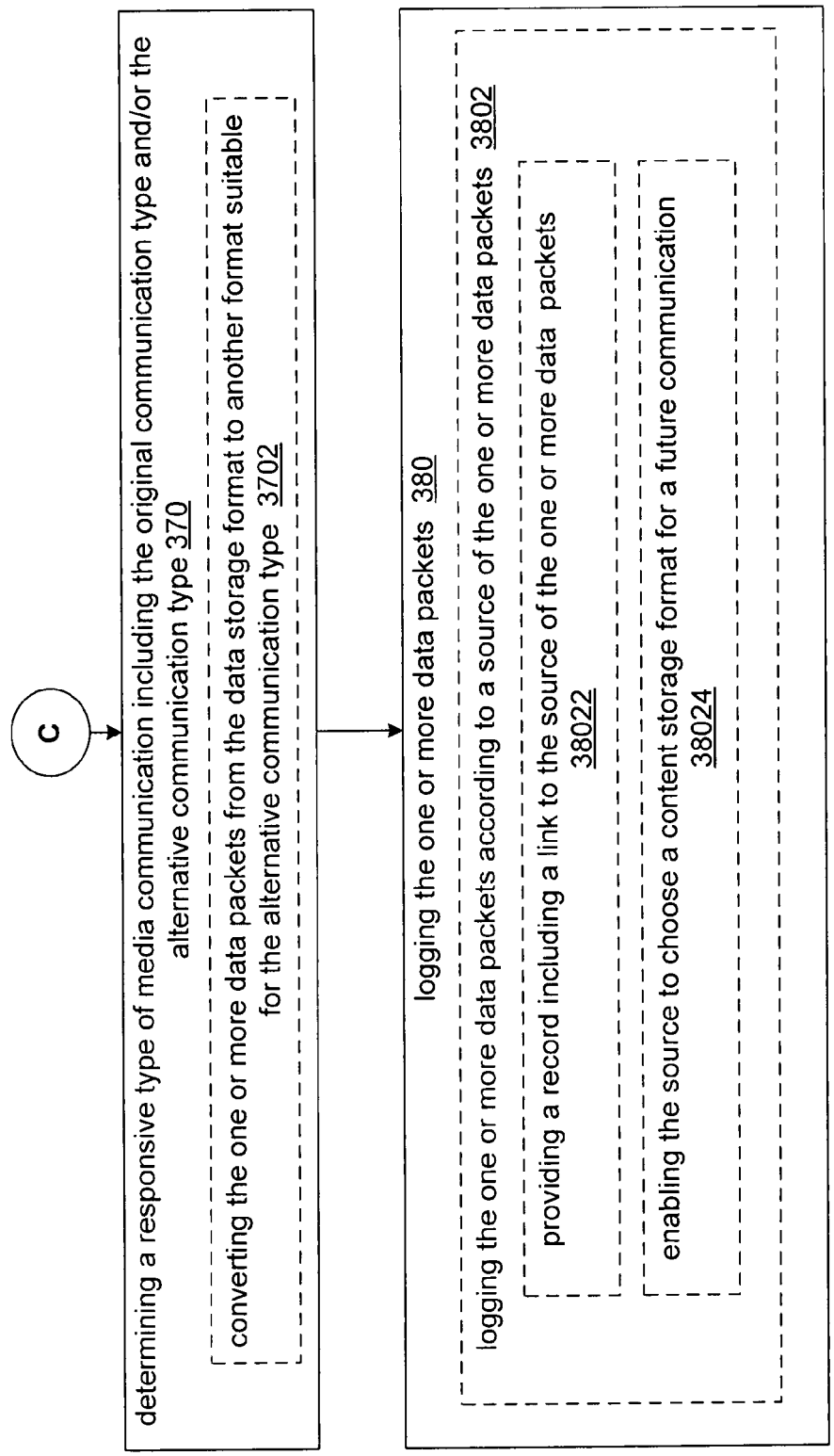

Referring now to FIG. 3D, the exemplary flow diagram continues with a further possible feature depicted in block 370. Block 370 provides for determining a responsive type of media communication including the original communication type and/or the alternative communication type (e.g., transceiver determining a responsive type of communication based on a received communication over network 108). Disposed within block 370 is optional block 3702 which provides for converting the one or more data packets from the data storage format to another format suitable for the alternative communication type (e.g., conversion module 250 converting the data packets from a data storage format for storing the data to a responsive type of media communication for transmittal over network 108).

The exemplary flow diagram of FIG. 3D continues with another possible feature depicted in block 380. Block 380 provides for logging the one or more data packets (e.g., logging module 290 logging the data packets received over network 108 and/or from within computer system 100). Disposed within block 380 is optional block 3802 which provides for logging the one or more data packets according to a source of the one or more data packets (e.g., logging module 290 logging the data packets received over network 108 and/or from within computer 100). Additional possible features depicted in blocks 38022 and block 38024 are illustrated within block 3802. Specifically, optional block 38022 provides for providing a record including a link to the source of the one or more data packets (e.g., logging module 290 logging the data packets and providing a record of the log wherein the record includes a link, such as an internet address or internal address to a source of the data packets). Optional block 38024 provides for enabling the source to choose a content storage format for a future communication (e.g., sending the source of the data packets an email or other communication or accepting the data packets conditionally upon a designation of a preferred content storage format for future communication).

Figure 4:
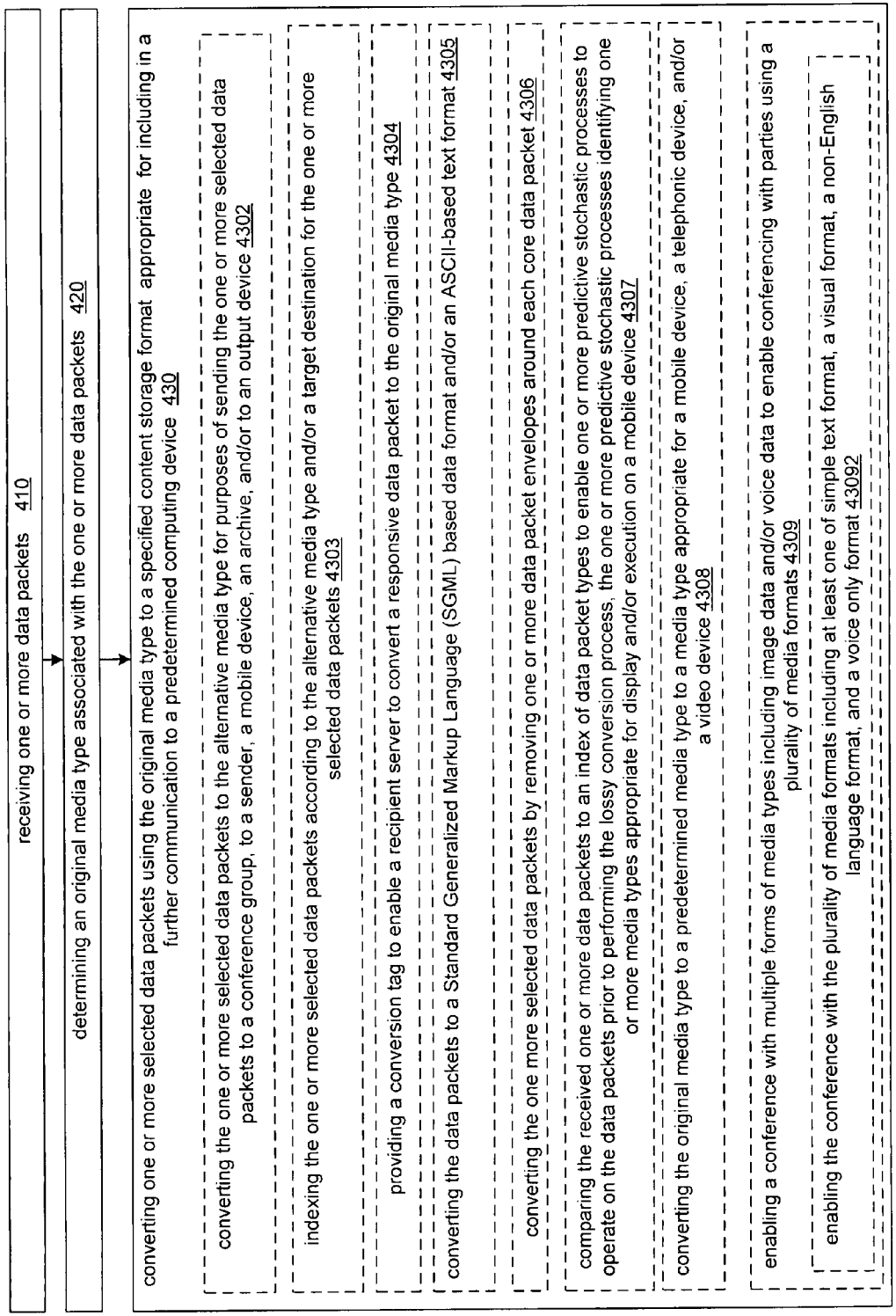
FIG. 4 illustrates a flow diagram of exemplary method features in accordance with further embodiments of the subject matter of the present application.

Referring now to FIG. 4, an exemplary flow diagram illustrates another method embodiment that includes various possible features for providing cross-media communication coordination.

Specifically referring to FIG. 4, block 410 provides for receiving one or more data packets (e.g., cross-media communication system 200 receiving data packets over network 108). Block 420 provides for determining an original media type associated with the one or more data packets (e.g., transceiver 240 and/or conversion module 250 determining an original media type of the data packets).

Block 430 provides for converting one or more selected data packets using the original media type to a specified content storage format appropriate for including in a further communication to a predetermined computing device (e.g., conversion module 250 converting the original media type to a predetermined media type for sending over network 108 according to a computing device determined to be connected to network 108). Depicted within block 430 is optional block 4302, which provides for converting the one or more selected data packets to the alternative media type for purposes of sending the one or more selected data packets to a conference group, to a sender, a mobile device, an archive, and/or to an output device (e.g., conversion module 250 converting the original media type to an alternative media type for purposes of sending selected data packets to any of a number of media formats).

Also depicted within block 430 is optional block 4303, which provides for indexing the one or more selected data packets according to the alternative media type and/or a target destination for the one or more selected data packets (e.g., indexing module 270 indexing the one or more selected data packets according to the alternative media type and/or a target destination for the one or more selected data packets).

Further depicted within blocks 430 is optional block 4304, which provides for providing a conversion tag to enable a recipient server to convert a responsive data packet to the original media type (e.g., conversion module 250 providing a conversion tag to enable a recipient server to convert responsive data back to an original media type).

Block 430 further depicts optional block 4305, which provides for converting the data packets to a Standard Generalized Markup Language (SGML) based data format and/or an ASCII-based text format (e.g., conversion module 250 converting data packets to an SGML-based format or an ASCII text format).

Block 430 further depicts optional block 4306, which provides for converting the one more selected data packets by removing one or more data packet envelopes around each core data packet (e.g., conversion module 250 converting data packets by removing envelopes around each core of a data packet).

Block 430 further depicts optional block 4307, which provides for comparing the received one or more data packets to an index of data packet types to enable one or more predictive stochastic processes to operate on the data packets prior to performing a lossy conversion process, the one or more predictive stochastic processes identifying one or more media types appropriate for display and/or execution on a mobile device (e.g., media engine 240 and processor 210 operating with conversion module 250 to compare received data packets to an index determined by indexing module 270 to enable one or more predictive stochastic processes to operate on the data packet prior to performing a lossy conversion process, the one or more predictive stochastic processes identifying one or more media types appropriate for display and/or execution on a mobile device).

Block 430 also depicts optional block 4308 which provides for converting the original media type to a predetermined media type to a media type appropriate for a mobile device, a telephonic device, and/or a video device (e.g., conversion module 250 converting an original media type to a predetermined media type to media type for a mobile device, telephone, and/or video device).

Block 430 further depicts optional block 4309, which provides for enabling a conference with multiple forms of media types including image data and/or voice data to enable conferencing with parties using a plurality of media formats (e.g., media engine 240 enabling a teleconference over network 108 with multiple forms of media types via conversion module 250 including image data and/or voice data to enable conferencing with parties using a plurality of media formats). Depicted within optional block 4309 is illustrated optional block 43092 which provides for enabling the conference with the plurality of media formats including at least one of simple text format, a visual format, a non-English language format, and a voice only format (e.g., conversion module 250 enabling the conference to take place with the plurality of media formats including at least one of simple text format, a visual format, a non-English language format, and a voice only format).

Those with skill in the computing arts will recognize that the disclosed embodiments have relevance to a wide variety of applications and architectures in addition to those described above. In addition, the functionality of the subject matter of the present application can be implemented in software, hardware, or a combination of software and hardware. The hardware portion can be implemented using specialized logic; the software portion can be stored in a memory or recording medium and executed by a suitable instruction execution system such as a microprocessor.

While the subject matter of the application has been shown and described with reference to particular embodiments thereof, it will be understood by those skilled in the art that the foregoing and other changes in form and detail may be made therein without departing from the spirit and scope of the subject matter of the application, including but not limited to additional, less or modified elements and/or additional, less or modified blocks performed in the same or a different order.

Those having skill in the art will recognize that the state of the art has progressed to the point where there is little distinction left between hardware and software implementations of aspects of systems. The use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skilled in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.)

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, Specific examples of operably couplable include but are not limited to physically mateable and/or physically interacting components and/or wirelessly interactable and/or wirelessly interacting components and/or logically interacting and/or logically interactable components.

Those skilled in the art will recognize that it is common within the art to implement devices and/or processes and/or systems in the fashion(s) set forth herein, and thereafter use engineering and/or business practices to integrate such implemented devices and/or processes and/or systems into more comprehensive devices and/or processes and/or systems. That is, at least a portion of the devices and/or processes and/or systems described herein can be integrated into comprehensive devices and/or processes and/or systems via a reasonable amount of experimentation. Those having skill in the art will recognize that examples of such comprehensive devices and/or processes and/or systems might include, as appropriate to context and application, all or part of devices and/or processes and/or systems of (a) an air conveyance (e.g., an airplane, rocket, hovercraft, helicopter, etc.), (b) a ground conveyance (e.g., a car, truck, locomotive, tank, armored personnel carrier, etc.), (c) a building (e.g., a home, warehouse, office, etc.), (d) an appliance (e.g., a refrigerator, a washing machine, a dryer, etc.), (e) a communications system (e.g., a networked system, a telephone system, a Voice over IP system, etc.), (f) a business entity (e.g., an Internet Service Provider (ISP) entity such as Comcast Cable, Quest, Southwestern Bell, etc.); or (g) a wired/wireless services entity such as Sprint, Cingular, Nextel, etc.), etc.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skilled in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general, such a construction is intended in the sense one having skills in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:

1. A method for coordinating communication, the method comprising:
    determining a data storage format, the data storage format being at least partially based on the data storage format of one or more computing devices determined to be connected to a network, including at least:
        enabling a source of one or more data packets to choose the data storage format from the one or more computing devices determined to be connected to the network;
    receiving one or more data packets via one or more modes of communication;
    providing the data storage format for the one or more data packets;
    providing an identification tag to enable manipulation of one or more selected data packets;
    converting the one or more selected data packets from an original communication type to an alternative communication type; and
    logging the one or more selected data packets according to a source of the one or more data packets.

2. The method of claim 1, further comprising:
    integrating the one or more data packets after providing the identification tag to enable responsive communication via any one of the one or more modes of communication.

3. The method of claim 1, further comprising:
    indexing the one or more data packets according to at least one or more of the following: content, subject matter, the one or more modes of communication or one or more sources of media communication.

4. The method of claim 3, wherein the indexing the one or more data packets according to at least one or more of the following: content, subject matter, the one or more modes of communication, and one or more sources of media communication includes:
    indexing the one or more data packets according to a predetermined user-defined characterization.

5. The method of claim 1, further comprising:
    indexing the one or more data packets according to a predetermined characterization of a source of the one or more data packets.

6. The method of claim 1, further comprising:
    indexing the one or more data packets according to a predetermined characterization of a content of the one or more data packets.

7. The method of claim 1, further comprising:
    indexing the one or more data packets according to a predetermined characterization of a mode of communication of the one or more data packets.

8. The method of claim 1, further comprising:
    indexing the one or more data packets according to a predetermined characterization of a subject matter of the one or more data packets.

9. The method of claim 1, further comprising:
    determining a responsive type of media communication including at least one of the following: the original communication type, and the alternative communication type.

10. The method of claim 9, wherein the determining a responsive type of media communication including at least one of the following: the original communication type, and the alternative communication type includes:
    converting the one or more data packets from the data storage format to another format suitable for the alternative communication type.

11. The method of claim 1, wherein the receiving one or more data packets via one or more modes of communication includes:
    receiving the one or more data packets from at least one or more of the following: a wireless communications network, an internet connection, a plain old telephone service (POTS) network, and a satellite network.

12. The method of claim 1, wherein the receiving one or more data packets via one or more modes of communication includes:
    receiving the one or more data packets at a server configured to receive the one or more modes of communication.

13. The method of claim 1 wherein the receiving one or more data packets via one or more modes of communication includes:
    receiving the one or more data packets with a content storage format, the content storage format including at least one or more of the following: encoded speech, encoded images, encoded instant messages, encoded text, compressed data, and encoded video.

14. The method of claim 1, wherein the providing the data storage format for the one or more data packets includes:
    converting the one or more data packets to a content storage format using a Standard Generalized Markup Language (SGML) based markup language.

15. The method of claim 1, wherein the providing the data storage format for the one or more data packets includes:
    converting the one or more data packets to a data storage format capable of compression for storage.

16. The method of claim 1, wherein the providing an identification tag to enable manipulation of one or more selected data packets includes:
    determining the identification tag, the identification tag identifying the original communication type and the alternative communication type.

17. The method of claim 16, wherein the determining the identification tag, the identification tag identifying the original communication type and the alternative communication type includes:
    associating the identification tag with a database listing each alternative communication type to which the one or more data packets can be converted.

18. The method of claim 1, wherein the providing an identification tag to enable manipulation of one or more selected data packets includes:
    identifying a content storage format to which the data packets can be converted.

19. The method of claim 18, wherein the identifying a content storage format to which the data packets can be converted includes:
    identifying a content storage format including one or more of an encoded speech, encoded images, encoded instant messages, encoded text, or encoded video.

20. The method of claim 1, wherein the logging the one or more data packets according to a source of the one or more data packets includes:
provising a record including a link to the source of the one or more data packets.

21. The method of claim 1, wherein the logging the one or more data packets according to a source of the one or more data packets includes:
enabling the source to choose a content storage format for a future communication.

22. The method of claim 1, wherein the converting the one or more selected data packets from an original communication type to an alternative communication type includes:
converting the one or more selected data packets according to an instruction received from at least one or more of the following: a source of the one or more data packets and a recipient of the one or more selected data packets.

23. The method of claim 1, wherein the converting the one or more selected data packets from an original communication type to an alternative communication type includes:
converting the one or more selected data packets from the original communication type to a communication type appropriate for at least one or more of the following: a conference communication, a transfer to an internal network of a source of the one or more data packets, a transfer to a security-enabled network, or a transfer to a personal communication device.

24. The method of claim 23, wherein the converting the one or more selected data packets from the original communication type to a communication type appropriate for at least one or more of the following: a conference communication, a transfer to an internal network of a source of the one or more data packets, a transfer to a security-enabled network, and a transfer to a personal communication device includes:
converting the one or more selected data packets to a communication type operating with a reduced instruction set as compared to the original communication type to enable the transfer to the personal communication device.

25. The method of claim 1, further comprising:
accepting the one or more data packets conditionally upon a designation of a preferred content storage format used for future communication.

26. The method of claim 1 wherein converting the one or more selected data packets from an original communication type to an alternative communication type comprises:
associating the alternative communication type with the data storage format of the one or more computing devices determined to be connected to the network.

27. The method of claim 1, further comprising:
indexing the one or more data packets indicating the one or more data packets are appropriate for storing data packets or temporary type data packets;
and wherein providing an identification tag to enable manipulation of one or more selected data packets includes at least providing an identification tag portion indicating the one or more data packets are appropriate for storing data packets or temporary type data packets.

28. The method of claim 1, wherein determining a data storage format, the data storage format being at least partially based on the data storage format of one or more computing devices determined to be connected to a network includes:
determining a data storage format, the data storage format being at least partially based on the data storage format of one or more computing devices, the one or more computing devices being currently connected to the network.

29. The method of claim 1 wherein enabling a source of one or more data packets to choose the data storage format from the one or more computing devices determined to be connected to the network includes:
enabling a source of one or more data packets to choose the data storage format from the one or more computing devices determined to be connected to the network, the source being at least one of a computer, a remote computer, a personal computer, a server, a router, a network PC, or a peer device.

30. The method of claim 1 wherein enabling a source of one or more data packets to choose the data storage format from the one or more computing devices determined to be connected to the network includes:
enabling a source of one or more data packets to choose the data storage format from the one or more computing devices determined to be connected to the network based at least partially on an internet address of the source of the one or more data packets.

31. The method of claim 1 wherein enabling a source of one or more data packets to choose the data storage format from the one or more computing devices determined to be connected to the network includes:
enabling a source of one or more data packets to choose the data storage format from the one or more computing devices determined to be connected to the network, the one or more computing devices determined to be connected to the network including at least one of an end user device, a computer, a remote computer, a personal computer, a server, a server device on a distributed server network, an open connect appliance, a router, a network PC, or a peer device.

32. The method of claim 1 wherein enabling a source of one or more data packets to choose the data storage format from the one or more computing devices determined to be connected to the network includes:
enabling a source of one or more data packets to choose the data storage format from the one or more computing devices determined to be connected to the network, the one or more computing devices determined to be connected to the network being at least one of a personal communication device or a mobile device.

33. The method of claim 1 wherein enabling a source of one or more data packets to choose the data storage format from the one or more computing devices determined to be connected to the network includes:
enabling a source of one or more data packets to choose the data storage format from the one or more computing devices determined to be connected to the network, the one or more computing devices determined to be connected to the network including at least one of a telephone or a video device.

34. The method of claim 1 wherein converting the one or more selected data packets from an original communication type to an alternative communication type includes:
converting the one or more selected data packets from the determined data storage format to an alternative format.

35. The method of claim 1 wherein converting the one or more selected data packets from an original communication type to an alternative communication type includes:
converting the one or more selected data packets from a first resolution to a second resolution.

36. A computer program product comprising:
a non-transitory computer readable storage medium bearing at least one of:
[a] one or more instructions for determining a data storage format, the data storage format being at least partially based on the data storage format of one or more computing devices determined to be connected to a network including at least:
one or more instructions for enabling a source of the one or more data packets to choose the data storage format from the one or more computing devices determined to be connected to the network;
[b] one or more instructions for receiving one or more data packets via one or more modes of communication;
[c] one or more instructions providing the data storage format for the one or more data packets;
[d] one or more instructions for providing an identification tag to enable manipulation of one or more selected data packets;
[e] one or more instructions for converting the one or more selected data packets from an original communication type to an alternative communication type; and
[f] one or more instructions for logging the selected one or more data packets according to a source of the one or more data packets.

37. The computer program product of claim 36, further comprising:
one or more instructions for integrating the one or more data packets after providing the identification tag to enable responsive communication via any one of the one or more modes of communication.

38. The computer program product of claim 36 further comprising:
one or more instructions for indexing the one or more data packets according to at least one or more of the following: content, subject matter, the one or more modes of communication, a predetermined user-defined characterization, or one or more sources of media communication.

39. The computer program product of claim 36 further comprising:
one or more instructions for indexing the one or more data packets according to a predetermined characterization of at least one of a source, a content, a mode of communication, or a subject matter of the one or more data packets.

40. The computer program product of claim 36 further comprising:
one or more instructions for determining a responsive type of media communication including at least one or more of the following: the original communication type and the alternative communication type.

41. The computer program product of claim 40 wherein the one or more instructions for determining a responsive type of media communication including at least one or more of the following: the original communication type and the alternative communication type includes:
one or more instructions for converting the one or more data packets from the data storage format to another format suitable for the alternative communication type.

42. The computer program product of claim 36 wherein the one or more instructions for receiving one or more data packets via one or more modes of communication includes:
one or more instructions for receiving at least one or more of the following: the one or more data packets from one or more of a wireless communications network, an internet connection, a plain old telephone service (POTS) network, and a satellite network.

43. The computer program product of claim 36 wherein the one or more instructions for receiving one or more data packets via one or more modes of communication includes:
one or more instructions for receiving the one or more data packets at a server configured to receive the one or more modes of communication.

44. The computer program product of claim 36 wherein the one or more instructions for receiving one or more data packets via one or more modes of communication includes:
one or more instructions for receiving at least one or more of the following: the one or more data packets with a content storage format, the content storage format including one or more of encoded speech, encoded images, encoded instant messages, encoded text, compressed data, and encoded video.

45. The computer program product of claim 36 wherein the one or more instructions for providing the data storage format for the one or more data packets includes:
one or more instructions for converting the one or more data packets to a content storage format using a Standard Generalized Markup Language (SGML) based markup language.

46. The computer program product of claim 36 wherein the one or more instructions for providing the data storage format for the one or more data packets includes:
converting the one or more data packets to a data storage format capable of compression for storage.

47. The computer program product of claim 36 wherein the one or more instructions for providing an identification tag to enable manipulation of one or more selected data packets includes:
one or more instructions for determining the identification tag, the identification tag identifying the original communication type and the alternative communication type.

48. The computer program product of claim 47, wherein the one or more instructions for determining the identification tag, the identification tag identifying the original communication type and the alternative communication type includes:
one or more instructions for associating the identification tag with a database listing each alternative communication type to which the one or more data packets can be converted.

49. The computer program product of claim 36 wherein the one or more instructions for providing an identification tag to enable manipulation of one or more selected data packets includes:
one or more instructions for identifying a content storage format to which the data packets can be converted.

50. The computer program product of claim 49 wherein the one or more instructions for identifying a content storage format to which the data packets can be converted includes:
one or more instructions for identifying a content storage format including at least one or more of the following: a encoded speech, encoded images, encoded instant messages, encoded text compressed data, and encoded video.

51. The computer program product of claim 36 wherein the one or more instructions for logging the one or more data packets according to a source of the one or more data packets further comprises:
one or more instructions for providing a record including a link to the source of the one or more data packets.

52. The computer program product of claim 36 wherein the one or more instructions for logging the one or more data packets according to a source of the one or more data packets further comprises:
one or more instructions for enabling the source to choose a content storage format for a future communication.

53. The computer program product of claim 36 wherein the one or more instructions for converting the one or more selected data packets from an original communication type to an alternative communication type includes:

one or more instructions for converting the one or more selected data packets according to an instruction received from at least one or more of the following: of a source of the one or more data packets and a recipient of the one or more selected data packets.

54. The computer program product of claim 36 wherein the one or more instructions for converting the one or more selected data packets from an original communication type to an alternative communication type includes:

one or more instructions for converting the one or more selected data packets from the original communication type to a communication type appropriate for at least one or more of the following: a conference communication, a transfer to an internal network of a source of the one or more data packets, a transfer to a security-enabled network, and a transfer to a personal communication device.

55. The computer program product of claim 54, wherein the one or more instructions for converting the one or more selected data packets from the original communication type to a communication type appropriate for at least one or more of the following: a conference communication, a transfer to an internal network of a source of the one or more data packets, a transfer to a security-enabled network, and a transfer to a personal communication device includes:

one or more instructions for converting the one or more selected data packets to a communication type operating with a reduced instruction set as compared to the original communication type to enable the transfer to the personal communication device.

56. A media system for one or more types of media, the media system comprising:

a processor;

a memory coupled to the processor;

a transceiver coupled to the processor, the transceiver configured to send and receive one or more data packets holding one or more types of media;

a media engine coupled to the processor, the media engine configured to integrate one or more types of media and to determine a data storage format for one or more received data packets, the data storage format being at least partially based on the data storage format of one or more computing devices determined to be connected to a network, the media engine being configured to enable a source of the one or more data packets to choose the data storage format from the one or more computing devices determined to be connected to the network;

a conversion module coupled to the processor, the conversion module configured to convert the one or more received data packets to a standardized data format; and a logging module coupled to the processor, the logging module configured to log the one or more received data packets according to a source of the one or more data packets in either a converted or an original media type to enable manipulation of the received one or more data packets.

57. The media system of claim 56 wherein the media engine coupled to the processor, the media engine configured to integrate the one or more types of media further comprises:

an indexing module coupled to the processor, the indexing module configured to receive one or more data packets in a standardized data format and index tile data packets to enable a search of the one or more data packets in the standardized data format.

58. The media system of claim 57 wherein the indexing module coupled to the processor, the indexing module configured to receive one or more data packets in a standardized data format and index the data packets to enable a search of the one or more data packets in the standardized data format includes:

an organization module configured to receive the one or more data packets in the standardized data format and index the one or more data packets according to one or more of subject matter of data packets, media type, and source of the one or more data packets destination.

59. The media system of claim 56, wherein the conversion module coupled to the processor, the conversion module configured to convert one or more received data packets to a standardized data format includes:

a reversion module configured to enable a user of the computing device to revert to the original media type.

60. The media system of claim 56, wherein the conversion module coupled to the processor, the conversion module configured to convert one or more received data packets to a standardized data format includes:

a coordination module configured to convert at least one or more of the following:

the one or more received data packets and a selected subset of the one or more received data packets to enable a user of the computing device to communicate using a predetermined media type.

61. The media system of claim 60 wherein the coordination module to convert at least one or more of the following: the one or more received data packets and a selected subset of the one or more received data packets to enable a user of the computing device to communicate using a predetermined media type further includes:

a content storage formatting module configured for converting at least one or more of the following: the one or more received data packets and the selected subset of the one or more received data packets to a specified content storage format appropriate for including in a further communication to a predetermined computing device.

62. The media system of claim 56 wherein the conversion module coupled to the processor, the conversion module configured to convert one or more received data packets to a standardized data format includes:

an alternative media module configured for converting the one or more received data packets to the standardized media type for purposes of sending the one or more selected data packets to a at least one or more of the following: conference group, to a sender, a mobile device, an archive, and to an output device.

63. The media system of claim 62, wherein the alternative media module is further configured for converting the one or more received data packets from the original media type to a media type appropriate for enabling a conference with one or more media types including at least one of simple text format, a visual format, a non-English language format, and a voice only format.

64. The media system of claim 56, wherein the conversion module coupled to the processor, the conversion module configured to convert one or more received data packets to a standardized data format is coupled to an indexing module configured to index the one or more received data packets according to at least one or more of the following: the alternative media type and a target destination for the one or more received data packets.

65. The media system of claim 56, wherein the conversion module coupled to the processor, the conversion module configured to convert one or more received data packets to a standardized data format includes:
- a tagging module configured to create a conversion tag to enable a recipient server to convert a responsive data packet to the original media type.

66. The media system of claim 56, wherein the conversion module coupled to the processor, the conversion module configured to convert one or more received data packets to a standardized data format is further configured for converting the one or more received data packets to at least one or more of the following: an SGML-based data format and an ASCII-based text format.

67. The media system of claim 56, wherein the conversion module coupled to the processor, the conversion module configured to convert one or more received data packets to a standardized data format is further configured for converting the one or more received data packets by removing one or more data packet envelopes around one or more core data packets.

68. The media system of claim 56, wherein the conversion module coupled to the processor, the conversion module configured to convert one or more received data packets to a standardized data format includes:
- a conferencing module configured for enabling a conference with multiple forms of media types including image data, voice data to enable conferencing with parties using a plurality of media types.

69. The media system of claim 56, further comprising:
- a communication link with the transceiver, wherein the communication link enables access via a network to a communication source for the one or more data packets.

70. The media system of claim 56, further comprising:
- a communication link with the transceiver, wherein the communication link enables a non-network access to a communication source for the one or more data packets.

71. The media system of claim 56, further comprising:
- a communication link with the transceiver, wherein the communication link enables access via a network to a computing device capable of receiving a responsive type of media communication in a suitable format.

72. The media system of claim 56, further comprising:
- a communication link with the transceiver, the communication link configured to enable a non-network access to a computing device capable of receiving a responsive type of media communication in a suitable format.

73. A system for coordinating communication, comprising:
- circuitry for enabling a source of one or more data packets to determine a data storage format based at least partially on one or more computing devices determined to be connected to a network;
- circuitry for receiving one or more data packets via one or more modes of communication;
- circuitry for providing an identification tag to enable manipulation of one or more selected data packets;
- circuitry for converting the one or more selected data packets from an original communication type to an alternative communication type; and
- circuitry for logging the one or more selected data packets according to a source of the one or more data packets.

* * * * *